June 4, 1935.  J. D. JORDAN  2,003,543
MEANS FOR SEPARATING SOLUTION COMPONENTS AND
PROCESS OF EFFECTING SEPARATION THEREOF
Filed March 27, 1933
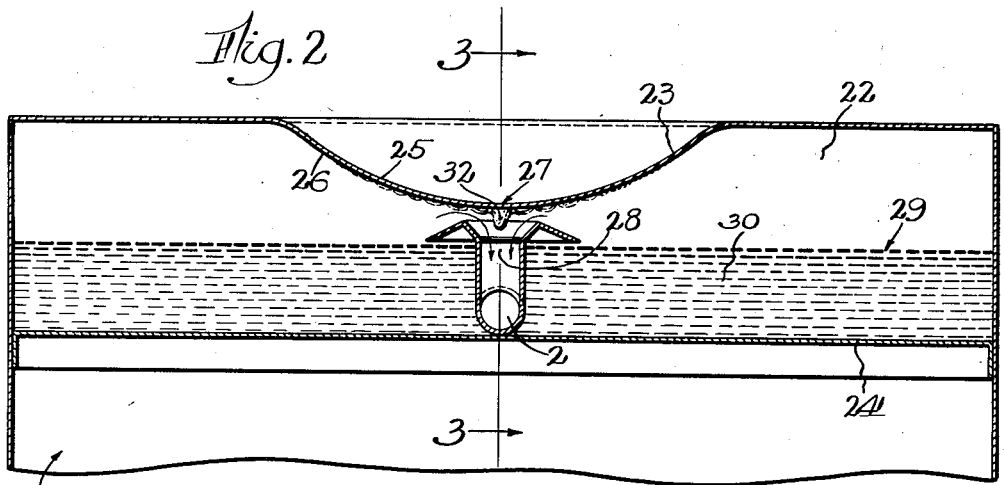
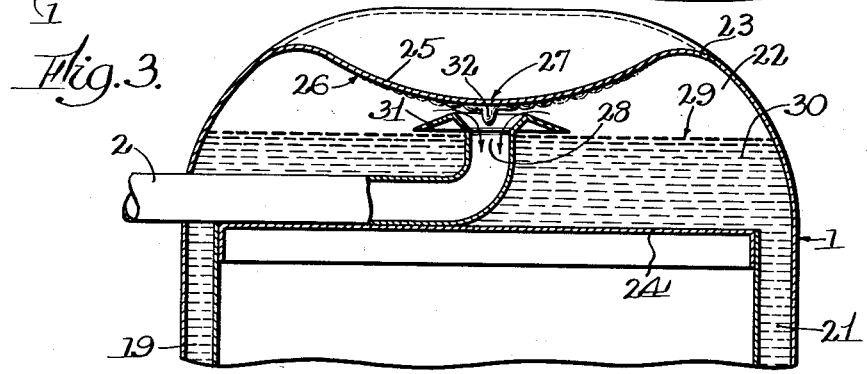
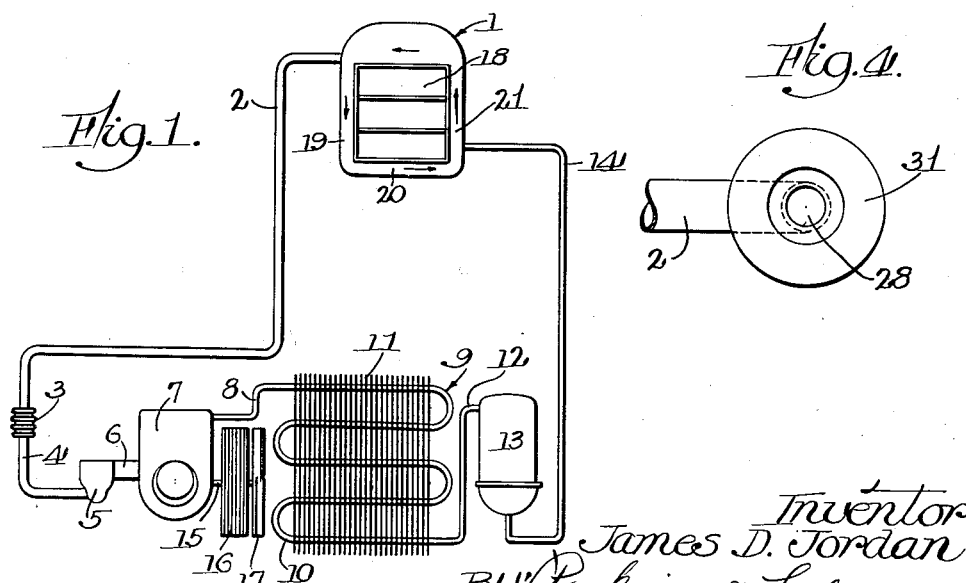
Inventor:
James D. Jordan
By Parkinson & Lane, Atty.

Patented June 4, 1935

2,003,543

UNITED STATES PATENT OFFICE 2,003,543

MEANS FOR SEPARATING SOLUTION COMPONENTS AND PROCESS OF EFFECTING SEPARATION THEREOF

James D. Jordan, Elmhurst, Ill., assignor, by mesne assignments, to General Household Utilities Company, Chicago, Ill., a corporation of Delaware Application March 27, 1933, Serial No. 662,990

14 Claims. (Cl. 62—126)

The present invention relates to the separation of components of a liquid solution, such as the separation of oil from a liquid refrigerant in which the oil is dissolved, in a refrigerating system.

In usual refrigeration there is essentially an evaporation of a fluid refrigerant for the absorption of heat. The refrigerant is a volatile liquid contained in an evaporator, and evaporation or ebullition is effected by mechanical exhaustion or chemical absorption. The former is known as the "pressure" type of refrigeration and the latter as the "absorption" type. The present invention relates to the pressure type. In such a type, is included means for converting the vapors into liquid state for reuse in the evaporator. The converting means comprises a pump frequently referred to as a compressor, and a cooling means often termed a condenser. The refrigerant generally used is sulphur dioxide. This substance has several disadvantages. It is corrosive, poisonous and has an obnoxious odor. In the presence of moisture or water, this substance forms an acid which attacks and corrodes the parts of the refrigerating device, causing leakage of the refrigerant and escape of its fumes. It is slightly miscible with oil, so that the oil used in the system for lubricating purposes forms a stratum on the surface of the liquid refrigerant in the evaporator, thus reducing the evaporative effect thereof. Entry of air in the system also reduces the refrigerating efficiency of the system. When air is mixed with the vapors of some refrigerants, an explosive mixture is produced and explosions of refrigerating devices from this cause have occurred. To remove the air, it is necessary to call a service man to service the device. The same is true when water is present in the system. The purging and recharging of such a system requires considerable skill, time and effort and is dangerous. Ammonia as a refrigerant, from a mechanical standpoint, is less desirable than sulphur dioxide. Methyl and ethyl chlorides have been used but they are poisonous, inflammable, and slightly explosive among other disadvantages, and are very undesirable.

The present invention comprehends the use of a refrigerant which avoids all of the disadvantages mentioned, such refrigerant being preferably dichloromethane or the like having the same or substantially the same physical characteristics. Dichloromethane is now obtainable in substantially pure state. It has the chemical formula $CH_2Cl_2$. It is non-inflammable, non-explosive, non-corrosive (with or without presence of moisture) of most metals used in refrigerating devices, non-poisonous and readily extinguishes fire, in both its liquid and gaseous or vaporous forms. At atmospheric pressure, it has a boiling point of about 105° F. and is, therefore, a liquid at all normal temperatures. Its density is above 1.33. Being a liquid it is easily handled and can be simply poured at any point desired into the refrigerating system to charge it. It does not give off objectionable fumes. Its vapor has a very slight and inoffensive odor. The vapor has a higher specific gravity than air and sinks in air, being about 3.0 specific gravity.

The refrigerant used with the present invention, is used at low pressure. This is very advantageous because it avoids any rupture in the system, and reduces leakage to a minimum. At an absolute pressure of 3.2″ Hg., its boiling point is 14° F. The pressure differential of the pump in the system used in connection with the present invention is about or less than one atmosphere, and the head pressure at the pump outlet is about atmospheric. This refrigerant has a greater thermal efficiency than any other known practical refrigerant. Its co-efficient of performance is 5.14 and is only 0.6 below the theoretical maximum. It requires less horse power per ton of refrigeration produced than any other known refrigerant. The term "ton of refrigeration" means the amount of refrigeration effected when melting a ton of ice. Its factor is 0.918 as against the theoretical factor of 0.821. It is miscible with oil and hence no stratum of oil can be formed on the refrigerant in the evaporator to strangle or choke the evaporation of the liquid refrigerant. The refrigerant used in connection with the present invention, may contain dissolved oil to the extent of 25% and the practical operation of the system occurs without decreasing the efficiency of the system. Even when the contents of the avaporator is half oil, the efficiency of evaporation is but slightly affected. In other words, if it were possible but not at all probable under ordinary conditions, to dissolve sufficient oil as to constitute a large portion of the contents of the system, the refrigerant still has the property of evaporating to the extent of producing a substantial exchange of heat, not materially different from the action of the refrigerant when it has practically no oil dissolved in it.

It is an object of the present invention to provide novel means for and a novel method of separating the oil from the refrigerant in which the oil is dissolved, and to maintain the content of oil in the refrigerant in the evaporator below a given point. I have found that with my invention I may maintain this below 1%.

Another object of the invention is to provide novel means for and a novel process of separating the oil by the adhesion or adherence of portions of the solution of the refrigerant and the oil in the form of a film or drops or droplets, to a surface such as the under surface of an inclined wall or the like located above the solution undergoing boiling or ebullition in the evaporator of the refrigerating system, and subjecting the adhering solution which may travel down the surface under the influence or force of gravity, to such a pressure and temperature as to effect an evaporation of the refrigerant component and to leave the oil in liquid state, the latter when reaching the lower part of the surface and growing or accreting to sufficient size and weight, then dropping or dripping from such surface, to be conducted away in a suitable duct or the like.

Other objects, capabilities, advantages, features and process steps are comprehended by the invention as will later appear and as are inherently possessed by the invention.

Referring to the drawing;

Fig. 1 is a schematic view of a refrigerating system using the invention;

Fig. 2 is a longitudinal sectional view taken through a part of a refrigerating system and embodying the invention;

Fig. 3 is a transverse sectional view taken in a plane represented by line 3—3 in Fig. 2 of the drawing; and, Fig. 4 is a top plan view of a part of the duct and its intake for conducting away the separated components.

Referring more in detail to the drawing, the embodiment selected to illustrate the invention is shown in connection with a refrigerating system comprising an evaporator 1 from which leads a vapor duct 2 connected by way of a flexible or compliant duct section 3, a duct part 4, a check valve 5, a duct section 6, and a pump 7. From the pump 7 leads a duct 8 to a condenser 9 comprising a serpentine coil 10 carrying heat radiating fins 11. The duct 10 leads by way of a duct 12 to a trap chamber 13 which is connected by way of a duct 14 for return of the condensed refrigerant to the evaporator. The pump is operated by way of a shaft 15 connected to a motor 16, a fan 17 being connected at the end of the shaft for causing the movement of cooling air through the condenser 9. The condenser is shown conventionally, but in actual practice it is disposed in a plane parallel to the plane of rotation of the fan. The duct segment 3 is flexible or compliant so as to absorb and prevent transmission of vibrations from the motor operated parts of the system to the other parts thereof. The check valve in actual practice is connected close to the inlet of the pump 7 so as to prevent back flow from the pump. The trap chamber is of such a size as to contain the total amount of liquid charge in the system, and also a float valve which is adapted to control the flow of the condensed and liquid refrigerant to the evaporator 1 by way of the duct 14.

The evaporator 1 surrounds and embraces a freezing zone box or compartment 18 and comprises circulatory ducts 19, 20 and 21 located at the sides and bottom of the compartment 18, and a chamber 22 in the upper part of the evaporator and confined between the dome 23 and a crown sheet 24 as shown in Figs. 2 and 3.

The dome 23 is provided with a downwardly and inwardly convexed wall portion 25 adapted to provide downwardly inclined under-surface 26 as clearly shown in Figs 2 and 3. Beneath the lower part 27 of this wall, is located the intake 28 of the duct 2, the latter extending exteriorly of the chamber 22. The upper end of the duct or the intake 28 is disposed above the normal liquid level 29 of the liquid or solution 30 in the evaporator. The intake 28 is provided with a flange 31 which is adapted to act as a baffle against the upward splash or spray of the liquid 30 when undergoing boiling or ebullition, directly into the intake 28.

In operation, the pump 7 operates to exhaust the vapors from the chamber 22, and so effecting a pressure, such as a sub-atmospheric pressure in the chamber 22, as to cause a boiling or ebullition of the liquid 30. This boiling action is more or less violent and turbulent and the liquid will splash up or cause a spray which will strike against or be cast upon the under-surface 26 of the wall 25, and will cling or adhere thereto in the form of a film or drops or droplets. This portion of the solution will gradually flow downwardly along the inclined surface 26 toward and to the low point 27. While this is occurring, the sub-atmospheric pressure and the sub-normal temperature in the chamber 22 is such as to cause an evaporation of the refrigerant component and thus leave the oil component in liquid state so that as the same moves gradually downwardly along the inclined surface, the drop of oil 32 will reach a position, as shown, above the intake 28. When this drop of oil has grown or accreted sufficiently in size and weight as to overcome the surface tension or adhesion, it will drop into the intake 28 and be conducted along the duct 2 to the pump 7 where it will be returned to the oil body in the casing of the pump. The baffle 31 acts to prevent direct splash and spray of the liquid 30 into the intake 28. The vapors produced and evolved from the boiling liquid 30 will also pass between the wall 25 and the intake 28 to be drawn into the duct 2. Inasmuch as this vapor is in gaseous or vaporous form, it will not reunite with the oil which drops or drips into the intake 28 and the tube 2.

As above indicated, the separation or extraction of the oil from the liquid 30 cast up or splashed against the under-surface 26, takes place at a rate sufficient to maintain the amount of oil in the liquid 30 below 1%. In this way the system operates automatically without mechanical moving parts, to maintain the evaporative efficiency to a maximum.

While I have herein described and upon the drawing shown an illustrative embodiment of the invention, it is to be understood that the invention is not limited thereto but comprehends other constructions, arrangements of parts, details, features and process steps without departing from the spirit of the invention.

Having thus disclosed the invention,

I claim:

1. A device for separating oil from the refrigerant of a refrigerating system having an evaporator, comprising a downwardly inclined wall portion in the upper part of the evaporator and above the normal level of the liquid therein, a duct leading from above said level and to the exterior of said evaporator, the inlet of the duct being beneath the lower part of said inclined wall portion for receiving oil that may drop therefrom.

2. A device for separating oil from the refrigerant of a refrigerating system having an evaporator, comprising a downwardly convexed wall portion in the upper part of the evaporator and above the normal level of the liquid therein, a duct leading from above said level and to the exterior of said evaporator, the inlet of the duct being beneath the lower part of said convexed wall portion for receiving oil that may drop therefrom.

3. A device for separating oil from the refrigerant of a refrigerating system having an evaporator, the upper wall of which has a downwardly extending portion having an inclined undersurface to which may adhere a solution of a refrigerant and oil splashed up and sprayed from the liquid in the evaporator when boiling or undergoing ebullition, means for effecting such a pressure in said evaporator as to effect an evaporation of the refrigerant and to leave only oil adhering to said surface, said means including a duct so arranged to receive the separated oil directly from said surface and to conduct it away.

4. A device for separating oil from the refrigerant of a refrigerating system having an evaporator, the upper wall of which has a downwardly extending portion having an inclined undersurface to which may adhere a solution of a refrigerant and oil splashed up and sprayed from the liquid in the evaporator when boiling or undergoing ebullition, means for effecting such a pressure in said evaporator as to effect an evaporation of the refrigerant and to leave only oil adhering to said surface, said means including a duct so arranged to receive the separated oil directly from said surface and to conduct it away, and means at the intake of said duct for preventing entry of the liquid splashed up and sprayed from the liquid undergoing boiling and ebullition.

5. A device for separating oil from the refrigerant of a refrigerating system having an evaporator the upper wall of which has a downwardly extending portion having an inclined undersurface to which may adhere a solution of a refrigerant and oil splashed up and sprayed from the liquid in the evaporator when boiling or undergoing ebullition, means for effecting such a pressure in said evaporator as to effect an evaporation of the refrigerant and to leave only oil adhering to said surface, said means including a duct so arranged to receive the separated oil directly from said surface and to conduct it away, the intake of said duct having a flange to act as a baffle against direct entry of splashed and sprayed liquid.

6. In a refrigerating system having an evaporator in which a liquid refrigerant containing oil in solution may boil, a device for separating said oil and refrigerant and comprising a downwardly inclined surface located above the normal level of the solution in said evaporator and to the under surface of which parts of the solution splashed and sprayed up from the boiling solution may adhere and move downwardly along said surface while being subjected to such pressure and temperature as to effect an evaporation of the refrigerant and leave the oil in liquid form to accumulate at the lowest point of said surface, and means for receiving said accumulated oil directly from said surface and for conducting away said received oil.

7. In a refrigerating system having an evaporator in which a liquid refrigerant containing oil in solution may boil, a device for separating said oil and refrigerant and comprising a downwardly inclined surface located above the normal level of the solution in said evaporator and to the under surface of which parts of the solution splashed and sprayed up from the boiling solution may adhere and move downwardly along said surface while being subjected to such pressure and temperature as to effect an evaporation of the refrigerant and leave the oil in liquid form to accumulate at the lowest point of said surface, and a duct having its intake beneath said lowest point of said surface for receiving and conducting away said oil.

8. In a refrigerating system having an evaporator in which a liquid refrigerant containing oil in solution may boil, a device for separating said oil and refrigerant and comprising a downwardly inclined surface located above the normal level of the solution in said evaporator and to the under surface of which parts of the solution splashed and sprayed up from the boiling solution may adhere and move downwardly along said surface while being subjected to such pressure and temperature as to effect an evaporation of the refrigerant and leave the oil in liquid form to accumulate at the lowest point of said surface, and a duct having its intake beneath said lowest point of said surface and spaced away from said surface for receiving and conducting away said oil and the vapors of said refrigerant from both the adhering solution and the boiling solution in the evaporator.

9. In a refrigerating system having an evaporator the top of which is downwardly depressed to provide a downwardly inclined surface on the underside thereof and in which a liquid refrigerant with oil in solution may boil and cast spray and splashes against said surface for adherence thereto of a part of said solution and down which said adhering solution may move under the force of gravity, a duct having an intake below the lowest point of said surface and spaced therefrom for providing a passage for the transmission of vapors from the interior of said evaporator to said duct, said duct extending to the exterior of said evaporator, and means associated with said duct and for effecting such a sub-atmospheric pressure in said evaporator as to effect an evaporation of the refrigerant component of said solution in said refrigerator and adhering to said surface and to leave the oil component of the solution adhering to said surface in liquid form, said duct and intake acting to receive said vapors and the oil from the lowest point of said surface and to conduct the same away.

10. A process of separating the components of a solution in a refrigerating system the components of which have different evaporating characteristics, comprising the steps of causing said solution to boil whereby to adhere to a surface, subjecting the adhering solution to such a pressure and temperature as to cause a component of the solution to evaporate and to leave the other component in liquid state, concentrating said liquid at a point of the surface, and conducting away said components after separation.

11. A process of separating oil from the refrigerant of a refrigerating system, by causing a solution of the refrigerant and the oil to so boil as to cast up some of the solution upon a surface to adhere to such surface, subjecting said adhering solution to such pressure and temperature as to effect an evaporation of the refrigerant and to leave the oil in liquid state, and concentrating said liquid at a point of the surface.

12. A process of separating oil from the refrigerant of a refrigerating system, by causing a solution of the refrigerant and the oil to so boil as to cast up some of the solution upon a surface to adhere to such surface, subjecting said adhering solution to such pressure and temperature as to effect an evaporation of the refrigerant and to leave the oil in liquid state, and concentrating the oil at point of the surface over the outlet of the evaporator whereby to remove the oil.

13. A process of separating oil from the refrigerant of a refrigerating system, by causing a solution of the refrigerant and the oil to so boil as to cast up some of the solution upon a surface to adhere to such surface, causing the adhering solution to move along such surface, subjecting said adhering solution to such pressure and temperature as to effect an evaporation of the refrigerant and to leave the oil in liquid state, and concentrating the oil at a point of the surface over the outlet of the evaporator whereby to remove said oil.

14. A process of separating oil from the refrigerant of a refrigerating system, by causing a solution of the refrigerant and the oil to so boil as to cast up some of the solution upon a surface to adhere to such surface, causing the adhering slution to move by the force of gravity to concentrate at a point in the lower portion of such surface, subjecting said adhering solution to such pressure and temperature as to effect an evaporation of the refrigerant and to leave the oil in liquid state, and causing said oil to drip from said lower portion of said surface.

JAMES D. JORDAN.